E. T. FERNGREN.
METHOD OF TREATING AND WORKING GLASS.
APPLICATION FILED JAN. 24, 1914.
1,415,824.
Patented May 9, 1922.
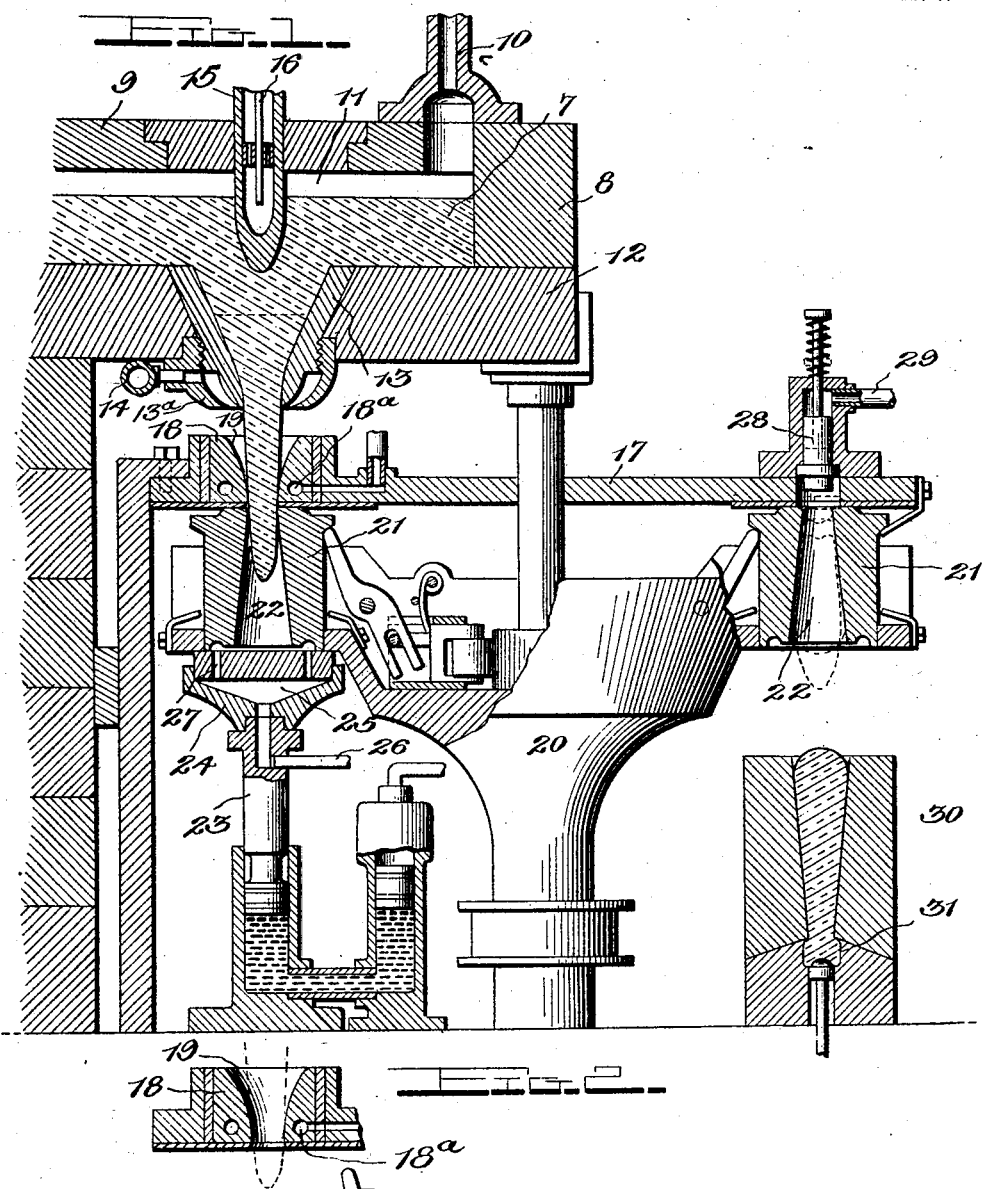
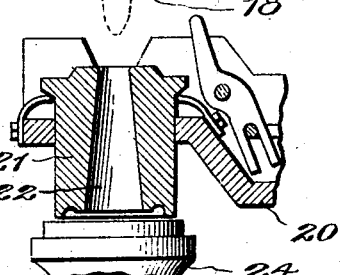

E. T. FERNGREN.
METHOD OF TREATING AND WORKING GLASS.
APPLICATION FILED JAN. 24, 1914.
1,415,824.
Patented May 9, 1922.
2 SHEETS—SHEET 2.
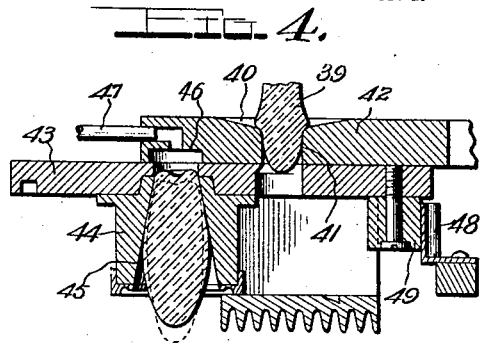
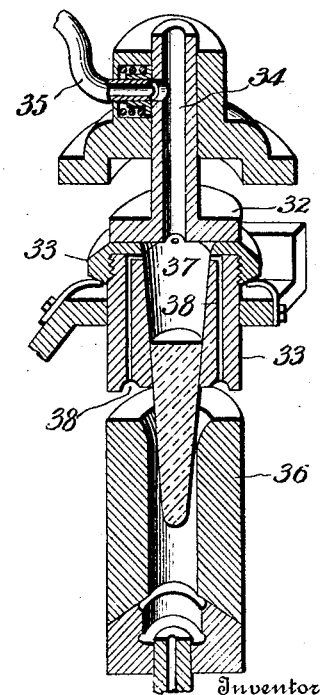
Inventor
E. T. Ferngren,

UNITED STATES PATENT OFFICE.

ENOCH THEODORE FERNGREN, OF BEAVER, PENNSYLVANIA.

METHOD OF TREATING AND WORKING GLASS.

1,415,824.  Specification of Letters Patent.  Patented May 9, 1922.

Application filed January 24, 1914. Serial No. 814,066.

*To all whom it may concern:*

Be it known that I, ENOCH THEODORE FERNGREN, a subject of the King of Sweden, residing at Beaver, in the county of Beaver and State of Pennsylvania, have invented new and useful Improvements in Method of Treating and Working Glass, of which the following is a specification.

The present invention, in some respects, in part of its underlying principles for dealing with and using the forces of nature, as applied to the automatic handling of molten glass during delivery thereof from melting tank to shaping molds, is related to my several co-pending applications for patents, respective Serial Numbers 679,236, 682,895 and 792,383, and also my granted Patent No. 1,196,848. The method disclosed in the patent is related in several respects, but while such is the case, many new and useful results, of considerable practical value in the art of making articles of glassware are brought into being by and obtained through the new method of treating and manipulating of glass herein disclosed, and which is not a part of the above patent disclosure.

The principal objects of the invention is to control the fluid movement of molten glass by various agencies during delivery from a furnace part flow head so that a flowing column of molten glass having a body, cross section and shape that nearly corresponds with the diameter of the bore of a blank forming element or mold, will be extended below and descend freely from the furnace part, where and when successive blank portions are severed therefrom without chilling undersupporting of the glass above the severing point and in accordance with and in conformity with the controlled free descent and flow thereof. Another principal purpose is the uniform formation of a plastic skin upon a cut-off blank portion of glass and thereafter the shaping of a neck thereon by impact.

Among the objects that require specific mention in order that they may be clearly understood are:

The heating of the entire surface or circumference of a cylindriform exodus of molten glass while in free descent from a discharge part for the purpose of reducing the surface tension and preventing the formation of a chilled film thereon before the initial and proper contact of the entire surface of the glass with forming means; the passing of molten glass from a furnace part through the passage or bore of a heated inlet part into a therewith adjoining cavity in a mold member, and severing said glass into a mold charge by a disjoining movement that produces a shearing action between said part and the member and lubricating the exposed rim of the passage with finely divided carbon; the occupation of approximately the entire concentric cavity space within a forming element with a freely flowing form of glass before said glass contacts therewith and then severing the glass in the element from that leading thereinto, as said form contacts with the walls of the cavity and deposits therein; the effecting of the severance of an entire mold charge from a freely by gravity descending column shaped flow of glass, while that portion of the column that forms said mold charge is in act of uniform descent as a body, and immediately thereupon imparting uniform surface chilling to the mold charge; the severing of mold charges from a by gravity delivering glass while causing a downward pull or speeding of the gravity movement of the glass at the severing point during each severing, and while causing an upward lift or retraction of momentary duration in the glass from which the mold charges are severed directly upon each severing as the above downward pull is terminated during severing.

Other novel features and modifications in the application of the method for practical purposes will be apparent to those skilled in the art.

In the accompanying drawings:—

Figure 1 is a view partially in section and partially in elevation of an apparatus for carrying out the method and discloses on one side the relationship of the mechanism to the descending glass practically at the moment of obtaining and detaching the mold charge therefrom, while at the other side is shown the manner in which the glass is released from a preliminary former and its reception in the blank mold proper.

Figure 2 is a detail view, illustrating the relation of the mechanism at a particular step in the method.

Figure 3 is a detail sectional perspective view of mechanism that shows a preliminary former and discharge actuator of different shape, but which can be used in a similar mechanism as that shown in Figure 1, and illustrating how another step may be slightly modified.

Figure 4 is a sectional view of another embodiment of mechanism illustrating a step in the method that may be carried out thereby.

Referring first to Figures 1 and 2, a body of molten glass is shown at 7, being located in a tank or container 8, and having its surface spaced a slight distance from the top 9 thereof. Communicating with one end of this space, is an off-take 10, through which an induced draft is created to carry off from the space 11, above the body of molten glass, the more or less oxidized atmosphere from the furnace. The space 11 is relatively small in order to insure a relatively high speed of movement of this atmosphere. As a result, the proper molten consistency of the glass is maintained, and its free flow or movement is permitted, while a molecular change in the composition of the glass is prevented.

The bottom 12 of this furnace is provided with a delivery nozzle or spout 13, that tapers downwardly, the end of said nozzle or spout being located below the bottom 12, and being surrounded by a downwardly inclined gas burner 13ª receiving its supply from a suitable conduit 14. Slidably mounted in the top 9 of the furnace, is a vertically disposed adjustable regulator 15, that is in line with the discharge orifice of the nozzle 13 and is movable toward and from the same. This regulator is hollow and preferably has a pipe 16 extending thereinto, to deliver a cooling agent. If the regulator 15 is made more narrow pointed than shown, relatively in the figure, it can be extended into and beyond the tip end of the nozzle 13, to a position wherever such regulating influence is desired.

A support 17 is located below the furnace, and carries the intake portion 18, forming also a port covering for a measuring element. This portion 18 comprises a body formed preferably of a silicon alloy or mixture containing tungsten or analogous metal. It is provided with a downwardly tapered bore 19, that opens through the bottom thereof.

A rotatable support or turntable 20 is arranged below the furnace and the support 17, and is provided with a plurality of preliminary blank formers 21, each of which member acts as a shearing agent in conjunction with the intake 18. The parts 21 have each a downwardly slightly flared bore 22, the upper or inlet ends of which are movable into and out of register with the lower end of a bore 19 of an intake portion 18. As each member 21, is positioned beneath the intake portion it is elevated on a vertically movable plunger 23, having a hollow head 24, that receives the same, said head being provided with a suction chamber 25. A conduit 26, connected to any suitable exhausting mechanism, communicates with the chamber 25, and said chamber is in communication with the lower end of the bore 22, through suitable ports 27, clearly shown in the drawing.

The said members 21 are carried by the turntable, on its rotation, to a point beneath a plunger 28, suitably mounted on the support 17, the plunger being adapted to operate in conjunction with the upper end of each member 21, having its lower end entering the same. The plunger 28 can be actuated by any means, as for instance, air under pressure delivered above it through a conduit 29. This air may be so delivered as to vibrate the said plunger. Arranged beneath the plunger and consequently beneath the member 21, that is located under the same, is a blank mold 30, the upper end of which is disposed in line with the lower end of the preliminary blank former 21, and this mold, as shown, may be provided with a portion 31 to form a neck.

Briefly described, the method that is carried out on the apparatus disclosed is as follows. A supply of glass is provided and superimposed within the enclosed space or chamber the bottom outlet of which constitutes the discharge nozzle 13, and centrally above the discharge orifice of nozzle and surrounded by the molten glass is located the regulator 15. This member by virtue of the circulation of air or other gases therein absorbs heat units from the glass that contacts therewith which causes a tenacious clinging of glass thereto and also affects the neighboring glass making the same more elastic in nature along a line passing from the tip of regulator 15 through the orifice of the nozzle and also influencing the glass that adjoins the elastic glass in a manner to decrease its liquid mobility in response to gravity or other force of actuation which is readily understood when the viscosity of molten glass is taken into account, and thus is provided a partly supporting and flow-retarding influence centrally along the line of gravity egress of the glass through the outlet orifice and below the same. While this effect is produced by the subtracting of heat units, the nozzle 13 is heated by burner 13ª, so that the glass in contact with the inner wall of the outlet passage in nozzle will receive additional heat units producing a greater degree of liquid mobility in said glass and the result is, that the glass issues and descends from the nozzle as a column-shaped body having practically this same diameter throughout its allotted length. The regulator 15 by appropriate reciprocatory adjustment toward and away from the flowing column will vary the amount of flow, and in this respect, actuate the glass, and obtain the same results as the rigid plunger member in my granted Patent No. 1,196,848, but with this difference, that the influence exerted by regulator 15 is more effective for the reversing of a limited outflow that extends below a flow opening without being supported from beneath.

The superheating produced by burner 13ª, extends by conduction to the inner wall of nozzle 13 to some such level as indicated by the dotted line, and in addition extends its heating influence into the space below the discharge orifice thereof, thereby preventing the formation of the usual envelope of chilled glass around the outside portion of a flow delivering glass. Such envelope while affording an elastic suspending support for the flow of glass from the edge of the orifice through which it flows, at the same time retards the flow movement of the exterior surface portion of the flow and constricts its diameter a very short distance from the flow orifice thereby so reducing the volume of the flow delivered therefrom that accumulative gathering is necessary in order to assemble a mold charge of sufficient quantity, which procedure is detrimental causing uneven congealing and distribution of glass in the article of glass that is made from the gather, also causing considerable of loss due to defects in the glass during its shaping up.

This column of glass will flow at a speed determined by the position of the regulator 15, as well as by the rate at which the heat units are absorbed and are carried off from the interior of said regulator 15 and during the passage of the glass from the nozzle to said intake portion, it is surrounded by the flame from the burner 13ª, which prevents the chilling from contact with the outside atmosphere, and the flame furthermore continuously deposits a slight carbonizing film on the exposed surface of the said intake portion 18.

With this arrangement, it is found that a nozzle of any reasonable cross sectional area of any shaped outline can be employed and a proper flow secured before the glass leaves the nozzle, because said nozzle and the glass at the surface is highly heated, and will not clink. As a result, a gravity action is obtained at the lower part of the nozzle that "pulls down" the glass above it, and causes the glass to flow downwardly in the nozzle under the pressure influences of the weight of the superimposed body of glass thereabove. This combined agency of a pressure head of molten glass above the discharge nozzle, and a nearly free gravity flow of the glass therein towards the delivery opening thereof, particularly in the neighborhood of the periphery of the discharge opening, causes a downwardly moving mass flow of molten glass having lateral dimensions or thickness of body nearly corresponding with the diameter of the delivery opening. The regulator 15 forms a solid center core within the center portion of the glass above the delivery opening of the nozzle, and functions to retard the downward flow movement of the glass in contact therewith by virtue of the clinging surface presented to the glass, and in addition removes direct overhead fluid pressure from the glass in the center portion above the discharge opening of the nozzle. By virtue of the clinging of the glass to the regulator 15, a reciprocating mass movement influencing nearly the entire body of glass in the nozzle, takes place, when a reciprocatory movement is imparted to the regulator in the glass above the nozzle, and during such operation the quantity discharge and movement of the flowing glass or column of glass through the delivery opening of the nozzle 13 is variably modified.

As already explained, the intake portion 18 of the measuring element is formed, preferably of a silicon alloy or mixture with tungsten or analogous metal, and this material, from the heat of the flame and of the glass, oxidizes and forms a slight film that prevents adhesion or sticking of the glass thereto during its passage.

As a result, the column with its superheated surface, has an unobstructed and uniform volume of flow, and the lower end of said column freely passes through the intake portion 18 above the measuring element. The diameter of the column of glass, as it descends from its origin, becomes slightly reduced in section, due to its somewhat accelerated velocity, in response to the gravity action on its mass, the lower portions of the column exerting a tension upon those above. Assuming now the relation of the parts, as illustrated in Figure 2, and the lower end of this column having passed through the intake portion 18, the preliminary former 21 is elevated to the position shown in Figure 1, and the column is then within said former, but is closely spaced from the walls thereof. The air is now exhausted from the bore 22 of former 21, resulting in so quickening the speed of the movement of the column through the intake 18, that it greatly exceeds the downward gravity movement of that portion of the glass or column that is in the bore 22, causing an instant translatory movement of glass in the direction of flow, resulting in a lateral as well as a vertical flow movement in the lower portion of column, and producing a swelling form of glass, that will immediately take on the shape of the bore 22. This quick shifting of glass in the column causes a decided downward pull thereon and elastic tension therein.

The turntable 20 is now given a partial rotation at a rapid rate while the air in bore 22 is exhausting and the atmospheric forcing of the glass thus caused is effective at the intake portion, which causes a quick shearing by the edge of the said former 21 acting with the adjacent edge of the intake portion 18, and as soon as the column is thus sheared from the body of glass within the said former 21, there will be a slight upward movement of said column, due to the fact that the extra rapid flow of the glass through the intake which continues even during the severing action, produces a downward pull far in excess of the pull caused by gravity alone upon the upper sections of the column when in normal descent, through which effect when the severing of the glass in the bore 22 is completed a considerable amount of elastic tension within the column is suddenly relaxed, as the column returns to its normal size. If the regulator 15 is appropriately reciprocated during the obtaining of the mass form of glass from the flowing column, a variable mass and flow movement is imparted to the body stream or column of glass issuing from the nozzle, a laterally increased mass flow of glass and a downwardly increased discharge following the downward movement of the regulator, and a reduced discharge of glass following the upward movement of the regulator. If the upward movement of the regulator 15 takes place and becomes effective on the flowing glass simultaneously to the severing of the measured quantity of glass from the lower portion of the flowing stream or column, and when the tension in said column is relaxed a more positive upward lift of the severed end of the column or pause in the downward flow movement thereof will be registered. It then continues its regular downward flow. Another preliminary former is provided beneath in spaced relation thereto, is elevated, and the action is repeated.

The shearing off of a portion of the column, filling the preliminary former, may be done by shearing knives, instead of by the eclipsing of ports, as above described. When shears are employed, the intake portion 18, as well as the suction action, may be dispensed with.

The preliminary former with blank therein is now carried to a position beneath the plunger 28, and above the blank mold 30. The formed body is then removed by operation of the plunger 28, and this operation, as above explained, is preferably in the form of vibration. The downward movement of the plunger 28 will, of course, cause a slight compression of air beneath it, and depress the glass, and the vibration of said plunger operating upon the top of the former, causes a series of mechanical shocks to said former. This releases the glass from the former, as will be evident. In the meantime, its lower end is elongated, as indicated in dotted lines, and said body will drop into the blank or shaping mold 30. The force of the falling body of glass will cause it to conform itself to the interior shape of the mold, and thereby in case a neck mold is employed, the neck will be formed merely by the forceful action of the glass dropping thereinto.

In Figure 3 is shown a discharge actuating plunger, marked 32, which when operated is adapted to forcibly descend upon a preliminary former 33, causing same, to suddenly drop down to the arresting springs that intercept the drop of the former and support the same in this position in which a source of compressed air is delivered to the bore 34 of the plunger 32 by a suitable conduit 35, to combine fluid pressure with mechanical shock, in projecting the blank from the bore 37 of former 33 into a shaping mold 36 therebeneath, by which action the said blank is caused to strike the bottom of the mold so forcibly that a neck and mouth portion of a bottle is shaped thereon. This former, 33 as indicated by its bore 37, is adapted to support a shorter and broader charge of glass and with its coactive intake portion should preferably function closer to the discharge orifice of nozzle from which the volume of glass issues. The bore of the intake portion for this kind of former should be larger in diameter so as to pass a thick volume of glass. For the formation of a larger diameter exodus of glass the control member 15 should operate nearer to the outlet orifice than shown in Figure 1, so that the central elastic supporting portion of the glass will be especially useful and the fluid movement of the discharging glass more readily responsive to the regulation of member 15, whether said member be in stationary position or is reciprocatorily engaged. The suction channels 38 in the former 33 communicate suction to the upper part of the bore 37 during the contacting of the walls thereof with the volume charge that is exuding and moving down from spout 13, through which suctional action, a negative pressure, is maintained around the sides of the glass as it freely enters the former 33, causing a lateral flow movement in the glass in the direction of the walls of bore 37, thereby so increasing the diameter of the entering glass that the same will first contact above the center portion of bore before occupying the lower portion thereof; the severing of the glass by the eclipsing orifice action between the former 33 and the intake should be accomplished before the glass reaches and covers the suction channels that communicate with the bore.

Mechanisms such as used in my granted Patent No. 1,196,848, may also with some modifications be employed in carrying out steps of the method and such a mechanism is shown in section in Figure 4.

A column of glass 39 is caused to deliver a short distance down from the outlet orifice of a flow spout so as to freely pass without contact through the port opening 41 of an intake portion 42. A downwardly divergent bore 45 in a body member 44 that is integral with a reciprocating part 43 is moved to the right into registry with the port opening 41 and while so moving any portion of the column of discharging glass that is below said port opening is cut off. While the bore 45 is in registry with the port 41 the column of glass will enter the bore 45 and charge the same with glass. As this takes place, the part 43 is moved to the left out of registry of bore 45 with the port opening 41, and into registry with an aperture 46 that is connected with fluid pressure means 47, and while so moved the glass in member 44 is severed from column while a cam element 48 is caused to move against a roller 49 which is secured to part 43, thereby communicating a lateral vibration to said part and member 44 so as to release the glass in bore 45 therein while moving into communication with the aperture 46, thereby effecting a quicker delivery of the glass from the bore 45 into a mold or other means for shaping. During the movement to the left of reciprocating part 43 the column is partially supported on the dished surface 40 that surrounds the port opening which is due to the under support given to the lower end of column during severing, but as member 44 is moved beyond the port opening the column 39 proceeds down to the port opening of member 42. The time consumed in discharging the former blank is, however, very short, and the movement to the right of member 43 again carries the body portion 44 across the lower opening of the bore 41 so that practically only that portion of the column that came in chilling contact with the port opening and the upper surface of the reciprocating part 43 has had time to move below the port opening 41, and this glass of the column is cut off to prevent its use because if used, said glass will receive a double chilling contact from the cutting edge of member 44 and a prolonged contacting with the interior surface of bore 41.

It will be noted that in each form shown, the body of glass is enclosed on all sides practically simultaneously and uniformly, and that the entire surface of the body of glass cut off, is simultaneously and uniformly chilled in the forming element. This will be evident when it is considered that when suction is applied, the glass strikes the bottom and sides almost simultaneously, the shearing motion incidentally follows, which slightly chills the top, and at the same time, the bottom of the former drops away. The action of gravity upon the glass and bottomless interior of the forming element causes a center flow of glass within the mass of glass therein, which pulls the sides of the glass away from the lower side walls of the forming element imparting a rounded form to the lower end of the glass therein, which partly depends downwardly below the bottom opening. The vibrating discharge action or shock immediately dislodges the body of glass, which, during the drop of the same, equalizes in temperature, thereby in effect remelting the surface, which had been equally chilled on all sides, so that when said body enters the shaping mold, the lower end is of more fluidic consistency, and there are no hard portions to prevent the shaping of the neck. Moreover, molecular tension between the shaped portion and the portion to be blown is of uniform consistency, which in its turn prevents breakage, and loss in the product, and also eliminates the now prevalent method of heating the neck portion to establish molecular non-stress.

My method of treating molten glass before the same freely issues and flows downwardly from an outlet is primarily based on that property of molten glass that is due principally to the influence of heat thereon during its formation, and which is responsible for the molecular adhesiveness of the fluid when the temperature is slightly reduced. The heat energy expended during the melting of glass causes a violent action and reaction until a mutual solution is formed that has no visible gaseous formation in its mass, due to the coaction of chemical action, gravity and atmospherical pressure. However, the molecules in the solution under the heat stimulant are still to a degree chemically active, and are partially divided from one another by gaseous envelopes or spaces, which, under the high temperature conditions prevailing in the molten mass, possesses a degree of expansive force, that is nearly equal to the atmospheric pressure upon the molten solution, and which act to partially repel and separate the molecules from one another, and, hence, fresh molten glass at the proper temperature is less adhesive and is amenable to cleavage. When the temperature of the glass is lowered, the gaseous envelopes or spaces active between the molecules are condensed and contracted because the heat is less than that required to stimulate the chemical action, and maintain an expanding energy within these spaces, and, as a result, a more intimate relation of the molecule takes place, and the cohesiveness of the glass is gradually increased from a liquid adhesiveness to an elastic, viscid, tenacious and plastic state as the glass is progressively reduced in temperature.

From the foregoing it can be understood by those skilled in the art that the differential heat treatment of the glass as it issues from the outlet (13) is mainly responsible for the large diameter of the descending column of glass, because the constant delivery of heat units to the exterior of the glass, before and as it issues, produces a more rapid fluid movement in the exterior portion thereof, while simultaneously the intermediate portion of the column is under the flow restraining influence that is produced by the heat absorbing regulator 15, that renders the glass more elastic along the center gravity axis of the column, both by the clinging and suspending support afforded as well as by the difference in downward velocity of flow, thereby produced along the axis of gravity above the outlet, which coacting influences causes the glass to descend and flow as a uniform cylindrical body of equal diameter, but slightly tapered in response to the gravity of its mass below the outlet.

In Figure 1, it will be understood that the intake portion 18 is heated by the flame from the burner and the continual passage of glass therethrough. The passageway 18ª disclosed therein is preferably for the purpose of venting the intake portion, but this passageway can also be used for regulating the temperature of the intake portion. It may furthermore be explained as to the regulator 15 that said regulator produces a body of glass of more tenacious and elastic character, and the absence of clinging at the outflow prevents pulling and stringing of the column, which would ordinarily result in a much reduced flow. There is thus produced a volume flow of greater diameter than was heretofore possible, and the close proximity of the intake portion to the outlet prevents any pulling out or stretching by gravity of the flowing stream. Instead of introducing the end of the column in measuring receptacles or preliminary formers, the glass may be successfully received in blank molds, which periodically elevate around the column and contact with the intake 18, and which sever the glass by moving across the bottom surface of the intake, and move downwardly after severing.

Having thus fully described my invention, what I claim as new, and desire to secure by Letters Patent is:

1. The method of treating glass, which consists in flowing molten glass from a reservoir through a refractory funnel, heating said funnel at its smaller end, where the glass discharges, in a manner to have said heat extend part way up the divergent walls of said funnel, surrounding the discharging glass with burning gases and of cooling the interior portion of said glass as it flows in said funnel before said glass issues therefrom, said cooling being done within the said funnel approximately along its axis, in line with the small end flow opening of said funnel.

2. The method of treating glass, consisting of flowing molten glass in a conduit in contact with a rapidly moving atmosphere of burning gases, flowing said glass from said conduit into a refractory funnel, retarding the flow of glass in the center portion of said funnel by adhesive contact with a temperature and flow regulating member, and while so treating the interior portion of the glass, freeing the glass in contact with the walls of said funnel from flow restricting congealing and clinging, by superheating said funnel, and issuing the glass so influenced from the delivery opening of said funnel as a depending downwardly moving cylindriform mass extension, corresponding in its lateral dimensions with the interior diameter of a blank forming receptacle and successively depositing portions of the issuing glass within successive blank forming receptacles in a manner to instantaneously occupy the whole blank-containing space in each of said receptacles.

3. The method of treating glass, consisting of flowing molten glass in a conduit, beneath and in contact with a blanket of non-oxidizing gas, flowing said glass from said conduit into a refractory funnel, cooling the central portion of glass, as it flows through said funnel, by contact with a cooling, supporting member, whereby a longitudinal tenacious string of elastically yielding glass is suspended from said supporting member and formed a core to the hotter glass, as the same issues from the flow opening of said funnel, increasing the temperature of the glass in contact with said refractory funnel as it issues, in a manner to free said glass from the lower wall and the lips of the flow opening of said refractory funnel.

4. The method of treating glass, consisting of flowing molten glass in a conduit, beneath and in contact with a high temperatured blanket of non-oxidizing glass, flowing said glass from said conduit, into a refractory funnel, in which is positioned centrally a cooling and supporting member, heating said funnel at its small end with a flame, flowing said glass through said funnel, whereby the central portion of the column issued is made tenacious and is suspended from said member and whereby the glass is freed from its clinging tendency to the interior surface of the funnel, at its lower end, and to the lips of the flow opening, as the glass leaves said funnel, and next passing the column of glass, so formed, through a heated atmosphere.

5. The method of treating glass, consisting in flowing molten glass through a passage, in contact with a cooling and supporting member, to a flow opening, having said member positioned in the flowing glass above said flow opening, re-heating said glass, near and at said flow opening, both before and after issuing therefrom, passing the issued column of glass through a tapered apertured member, made of a mixture of silicon and tungsten, entering said column in a diamensionally corresponding interior bore of a former, detaching the glass received in said former from said column, and removing said former to operative position with ejecting means, whereby said received glass is discharged from said former into a shaping mold.

6. The method of treating glass, which consists in advancing a mass of glass downwardly from a superimposed body of glass in a receptacle through a superheated funnel, flowing said mass of glass synclinally towards the discharge opening of said funnel, introducing within the body of said downwardly flowing mass of glass, directly above the discharge opening of said funnel, a temperature reducing medium, lowering the temperature of the glass in contact therewith and causing said glass to become plastic and cling to said medium, and thereby exerting a supporting influence upon the center portion of the glass moving downwardly within said funnel and above said opening and issuing beyond the said opening, flowing said glass so influenced beyond the confines of said funnel as a downwardly gravitating mass of glass column shaped in form, and thereafter intermittently detaching a body form of glass of cylindriform mass proportion from said flowing column as it develops below said discharge opening, and depositing each of said forms of glass in a blank forming mold.

7. The method of forming a blank form of glass, which consists in issuing a cylindroidal mass flow of glass, from a superimposed body of the same through a flow opening, supporting the interior of the said mass flow from a centrally disposed viscosity inducing clinging medium, and releasing and lubricating the exterior of said flowing mass at its point of departure from said body of glass and successively introducing the lower end thereof into receptacles out of contact with the exterior surface of said flowing mass, and imparting a broadening effect, to said flowing glass within each receptacle against the walls thereof, and simultaneously thereto severing off and removing the glass in the receptacle from the downward path of said flowing mass.

8. The method of forming a blank body of glass for hollow ware, which consists in forming a downwardly moving and depending column of glass from a body of the same, elevating around the lower end thereof a blank mold, the interior walls of which are out of contact with said column, and exhausting the air from the interior of the said mold while the column moves downward thereinto.

9. The method of forming a blank body of glass for hollow ware, which consists in forming a downwardly moving and depending column of glass from a body of the same, elevating around the lower end thereof a blank mold, the interior walls of which are out of contact with said column, and exhausting the air from the interior of the said mold while the column moves downward thereinto and the mold moves upwardly around the said column.

10. The method of manipulating glass, which consists in providing a body of molten glass within a container, passing above the said body a heating medium, removing the medium therefrom by induced draft, forming a column shaped extension of molten glass from the said body, and reducing the temperature of the interior and superheating the exterior thereof during said forming, advancing said column downwardly and intermittently entering the lower end thereof into a forming receptacle, and cutting off said lower end by a transverse severing movement across the path of said downwardly flowing column.

11. The method of charging molds which consists in successively freely flowing a blank shaped body of molten glass from a heated outlet and periodically severing and removing the major portion of said body after each successive forming thereof below said outlet, in blank molds that successively elevate to freely surround and enclose each body during its formation.

12. The method of manipulating glass, which consists first in producing a free flow of glass that has practically the same diameter as that of a blank and that is to be formed; second, in cutting off of a blank form of glass from said flow; and, third, in associating the lower end portion of said glass with the interior of a neck mold with such impact that the neck of a bottle is instantly shaped thereon.

13. The method of molding glass, which consists in continuously flowing a volume stream of glass in nearly parallel cylindrical stream lines from a superheated flow opening, intermittently elevating a forming element vertically while such stream of glass flows downwardly, surrounding the flowing stream with the walls of said forming element during said elevating movement, and causing a simultaneous contact of the stream of glass with the walls of said forming element, and producing an instantaneous filling of the said element thereby without buckling or lapping of the stream during said filling, and coincident therewith severing off the glass in the forming element from the stream, and delivering the glass from the forming element to a mold under force actuation, and imparting a permanently shaped form to a portion of the glass received by said mold by the impact of the glass with the bottom portion of said mold.

14. The herein described method, which consists in producing a cylindriform outflow of glass from a glass delivering medium and successively freely entering and occupying the interior space of a series of periodically associated blank molds with consecutive portions of said flow as it develops below said discharge medium in such a manner that said outflow of glass is received in each of said molds as a whole and nearly mold filling body of glass that is freely inserted before it contacts with the interior confines of each of said molds, and successively severing said glass as it contacts with each of said molds at a point adjacent to said glass delivering medium without chilling the cylindriform exterior of the glass with shearing means above the plane of severance.

15. The method of charging preliminary formers with glass, which consists in advancing a freely flowing stream of glass from a conduit and successively positioning in its path of flow a series of preliminary formers each of which has an interior bore corresponding in diameter with the transverse cross section of said flowing stream, and successively depositing said stream and charging each former with successive portions of the advancing stream without causing the flowing glass to lap and gradually accumulate during said charging and successively shearing off each depositing portion of said stream and removing said portions in said formers without obstructing the downward movement of said stream after said severing.

16. The method of manipulating glass in its molten state which consists of flowing the glass from a melting tank to a downwardly tapering outlet, passing the glass downwardly from said outlet as a freely flowing stream, separating bodies of glass from the flowing stream, immediately and simultaneously chilling the entire surface of each separated body, during the separating action and while removing the said bodies successively from the path of the stream, equalizing the temperature of each body and absorbing and dissipating the chilling imparted to the surface, and depositing each body into a shaping mold with sufficient impact to form the neck portion of a bottle.

17. In glass manufacture, the method which consists in advancing molten glass of consistent fluidity through a heat delivering atmosphere and a heated shearing medium, and periodically severing and removing predetermined mold charges, of elongated shape from the advancing glass without exposing the glass to fluidity impairing conditions before said periodic action, forming a uniform plastic skin in the exterior portion of each elongated shape by manipulative concentric contacting and release from a cooling medium, and further elongating said shape during such procedure, and thereafter delivering each of said shapes to shaping molds provided with neck-forming portions, and forming the neck and mouth of the bottle on the lower end thereof by impressing impact with said portions.

18. The method of manipulating glass, which consists in depositing a plastic body of glass into a neck mold by gravity, and molding such neck by the force with which the body is deposited.

19. The method of manipulating glass, which consists in forming a blank body of glass, suspending the same over a neck mold, dislodging the suspended body, permitting it to fall into a neck and body mold, and by the velocity of the falling body, filling the neck mold.

20. The method of manipulating glass, which consists in depositing, by gravity, a body of glass into a shaping mold with sufficient force to cause a portion of said body to fill the neck mold, and leaving the remainder in condition to be blown.

21. The method of manipulating glass, which consists in forming and discharging a stream of glass from a furnace part, cooling the portion of the glass that occupies the center of the stream before the same issues from the furnace part, delivering heat units to the exterior of the stream of glass as it descends beneath said part and surrounding successive portions of the stream with a concentric surface cooling and body-shaping elements and cutting off each such surrounded portion from the flowing stream.

22. The method of forming a blank body of glass which consists in forming a by gravity downwardly flowing stream of molten glass of predetermined diameter and volume, passing the flowing stream through an intake portion, elevating around the stream below the intake portion a blank former, engaging the flowing glass therewith by exhausting the air from said former, and then severing a blank of glass from the stream, without interrupting its passage through the intake portion during severing.

23. The method of forming a blank body of glass which consists in forming a by gravity downwardly flowing stream of molten glass of predetermined diameter and volume, passing the flowing stream through an intake portion, elevating around the stream below the intake portion a blank former, engaging the flowing glass therewith by exhausting the air from said former, and then severing a formed blank of glass from the flowing stream without interrupting its passage through intake portion during severing and without obstructing the movement of the stream of glass downwardly through the intake portion after severing.

24. The method of forming a blank body of glass, consisting in forming a freely flowing stream of molten glass that has a diameter nearly corresponding with the interior of a blank former, passing the flowing stream of glass through an intake portion, while filling said portion laterally, elevating around the flowing stream below the intake portion a blank former, engaging the flowing glass therein while exhausting the air from said former, and then shearing off a cylindriform section from the flowing stream entering into said former by removing the former and the glass therein transversely across the line of flow at the termination of the former's coaction with the intake, and continuing the passing of said stream through said intake after said severing and removal and elevating succeeding blank formers to engage the same.

25. The method of treating glass, which consists in flowing molten glass from a melting tank through a discharge outlet, and maintaining a constant level of glass above said outlet, passing above said level through a narrow space an atmosphere superheated and surcharged with the volatile products resulting from the glass melting operation in said melting tank, and maintaining said glass in a freshly molten solution and composition by said heating medium, imparting column like dimensions to the glass that flows downward from said outlet by gravity and the influences of two different temperature conditions, and controlling the downward flow movement thereof by a vertically adjustable, needle-shaped member, positioned in the mass of glass above said outlet, successively depositing a portion of said downwardly flowing column in successive forming mediums, adapted to elevate around the column as it moves downwardly, and successively dividing off formed and measured masses of glass in conformity with the controlled downward motion of said column.

26. The method of treating glass consisting in delivering a downwardly flowing stream of glass into the intake portion of the forming element, lubricating the passage of the flowing stream through said intake portion by the depositing of finely divided carbon between the stream and the surface of said intake portion, and sustaining the fluidic condition by temperature influences surrounding the same as it passes through said intake portion, forming blank portions of glass from said flowing stream by the aligning of the blank forming element with the said intake portion, and successively severing formed blanks of glass from the flowing stream, by a shearing motion above its plane of formation and transversely to the path of the flowing glass.

27. The method of preventing fluid glass from sticking to a heated surface, which consists in interpositioning between the glass and the heated surface a continuously depositing finely divided carbon.

28. The method of preventing flowing glass from adhering to the walls of the passage, to which said glass contacts as it passes therethrough, which consists in continuously depositing particles of carbon between said walls and the flowing glass.

29. The method of feeding glass to molds which consists in flowing a stream of glass into and through a zone of active radiant combustion and a heated shearing medium and periodically cutting mold charges from the stream as it emerges from said radiant zone, and varying the amount of flow by the adjustment of a clinging, medium toward and from said stream.

30. The method of delivering glass to a hollow receptacle which consists in passing molten glass through the bore of a heated member into the adjoining hollow cavity of the receptacle, severing the glass between the receptacle and the heated member and lubricating the surface of the bore in the heated member by depositing finely divided carbon on the exterior of the surface portions of the said member.

31. The method of forming mold charges which consists in flowing a stream of glass freely through a surrounding heat delivering flame and a heated shearing medium towards a series of molds successively elevating towards said stream and shearing medium, and successively severing mold charges at said shearing medium without obstructing the downward movement of the remaining portion of said stream thereby.

32. The process of extruding molten glass from a furnace part, which consists in passing the glass around a central slightly cooled adjustable member to which it will cling, while moving downwardly through a superheated outlet to which it will not cling, and thereby extruding a column of glass, of substantially the same cross section as the outlet, and varying the ratio of descent of the column without materially altering its cross section by appropriate adjustment of the member toward and from the column.

In testimony whereof I have hereunto set my hand in presence of two subscribing witnesses.

ENOCH THEODORE FERNGREN.

Witnesses:
  B. G. FOSTER,
  E. G. MCCARTHY.